United States Patent [19]

Kusano

[11] 4,124,422
[45] Nov. 7, 1978

[54] METHOD OF PRODUCING FLEXIBLE PIPE WITH SOCKET SECTION

[75] Inventor: Hiroshi Kusano, Hyogo, Japan

[73] Assignee: Kubota, Ltd., Osaka, Japan

[21] Appl. No.: 685,152

[22] Filed: May 11, 1976

[30] Foreign Application Priority Data

May 13, 1975 [JP] Japan ................................ 50-57747

[51] Int. Cl.² ...................... B29D 23/00; F16L 47/06; F16L 23/02
[52] U.S. Cl. .................................. 156/165; 156/172; 156/294; 29/451; 285/260; 285/291
[58] Field of Search ................ 285/21, 260, DIG. 16, 285/291, 381, 423, 113, 323, 421; 156/165, 160, 162, 156, 173, 191, 192, 330, 293, 294; 29/446, 450, 451

[56] References Cited

U.S. PATENT DOCUMENTS

| 3,036,948 | 5/1972 | Danielson | 156/330 |
|---|---|---|---|
| 3,149,861 | 9/1964 | Larsson | 29/451 |
| 3,217,400 | 11/1965 | Illesy et al. | 29/450 |
| 3,770,480 | 11/1973 | Farnam | 428/443 |
| 3,953,059 | 4/1976 | Carroll et al. | 29/446 |
| 3,969,170 | 7/1976 | Landgraf | 285/21 |
| 3,971,578 | 7/1976 | Schemith | 285/260 |

*Primary Examiner*—William A. Powell
*Assistant Examiner*—William H. Thrower

[57] ABSTRACT

A method is disclosed for the production of flexible pipes having a socket in which a socket element is fixed in overlapping relation to one end portion of a fabricated flexible pipe. The end portion of the pipe is elastically reduced in diameter and the socket element overlapped or telescoped with the reduced end portion. The socket element is then fixed to the reduced end portion of the pipe firmly under elastic stress when the reducing pressure is released. An elastic member may be interposed between the end portion of the pipe and the socket element at the overlap.

12 Claims, 21 Drawing Figures

METHOD OF PRODUCING FLEXIBLE PIPE WITH SOCKET SECTION

SUMMARY OF THE INVENTION

The present invention relates to a flexible pipe with a socket section and more particularly it relates to a flexible pipe with a socket section of the type wherein a FRP (fiber-reinforced plastics) pipe, a thermosetting resin pipe, a composite pipe having inner and outer layers formed of said pipe materials and an intermediate layer formed of resin mortar, or other straight flexible pipe which cannot be or can hardly be subjected to a secondary processing operation has a socket member integrally attached to one end portion thereof. It also relates to a method of producing the same.

For the production of flexible pipes having integral socket sections, usually a batch system is employed in which articles are produced one by one by using a mandrel having an outer surface conforming to the shape of the pipes to be produced or a hollow cylindrical mold having an inner surface conforming to said shape. Such batch system, however, has the drawback that the productivity is low. Alternatively, in order to overcome this drawback, particularly in the case of medium and small diameter pipes, straight pipes are produced by a continuous forming process or the like and one end of a collar having socket sections on the opposite sides thereof and a pipe end positioning annular projection on the middle inner surface region thereof is fitted over one end of a straight pipe of predetermined length with a seal rubber ring interposed therebetween, whereby such pipe is used as a flexible pipe with a socket section or a substitute therefor. In this case also, however, the complicated shape of the collar results in the increased total man-hour while the provision of socket sections on the opposite sides incurs a high cost of materials, so that the product is expensive. A method has also been proposed in which a socket member forming a socket section is formed on the outer surface of one end portion of said straight pipe in such a manner that part of the socket member overlaps the latter. In this case, however, the resulting sealing quality of the junction between the straight pipe and the socket member and the resulting junction strength are insufficient, bringing about drawbacks including the leakage of pipeline fluid particularly under high pressure, and the separation in the junction between the straight pipe and the socket member due to the difference in the amount of flexure between them when the pipe is deformed under soil pressure.

Accordingly, principal object of the present invention is to provide a flexible pipe with a socket section which is capable of solving all the various problems described above, and a method of producing the same.

The present invention provides a method of producing a flexible pipe with a socket section wherein one end of a straight pipe of predetermined length consisting of a flexible pipe is either intetrally formed or fitted with a socket member in such a manner that they partially overlap each other, said method being characterized in that the straight pipe and the socket member are made integral with each other in such a manner that at the junction between the straight pipe and the socket member an internal stress is acting to provide a force fit therebetween. According to such method, straight pipes, which can be produced with high productivity are used and such straight pipe is integrated at one end portion thereof with a socket member. Thus, as compared with the abovedescribed batch system and the collar joint system, such flexible pipes with socket members can be provided at low costs. Moreover, according to a flexible pipe with a socket section produced by such method, since a force is acting at the junction between the straight pipe and the socket member effective to provide a force fit therebetween, it follows that the straight pipe and socket member are strongly joined together. Therefore, even in the case of fluid under high pressure, there is no danger of the pipeline fluid leaking, and there is little danger of separation taking place at the junction even if the pipe is flexing owing to the deformation thereof under soil pressure when embedded in the ground or to non-uniform subsidence of ground. Such separation would cause the leakage of the pipeline fluid.

According to the preferred embodiment of the present invention, the straight pipe and the socket member are integrated with each other with an elastic member interposed between the outer surface of one end portion of the straight pipe and the overlap inner surface of the socket member. According to a flexible pipe with a socket section produced by such method, even if the flexure of the pipe caused by soil pressure or by non-uniform subsidence of ground causes the straight pipe and the socket member to deform differently, the relative deformation of the two is absorbed by the deformation of the elastic member and hence the separating force acting on the junction between the straight pipe and the socket member is absorbed, so that there is no danger whatsoever of the leakage of the pipeline fluid taking place at the junction surface owing to separation. Further, since the elastic member interposed between the one end portion of the straight pipe and the socket member precludes the possibility of the rigidity of the socket section being particularly increased, with two such flexible pipes connected together the socket section of one pipe and the plug section of the other pipe inserted in said socket section will deform to substantially the same degree, so that there will be little danger of the clearance between the socket section and the plug section becoming non-uniform, thus providing a satisfactory sealing at the joint, obviating the danger of the pipeline fluid leaking through the joint.

Other numerous features and merits of the present invention will be readily understood from the following description of embodiments of the invention with reference to the accompanying drawings.

Figure 1:
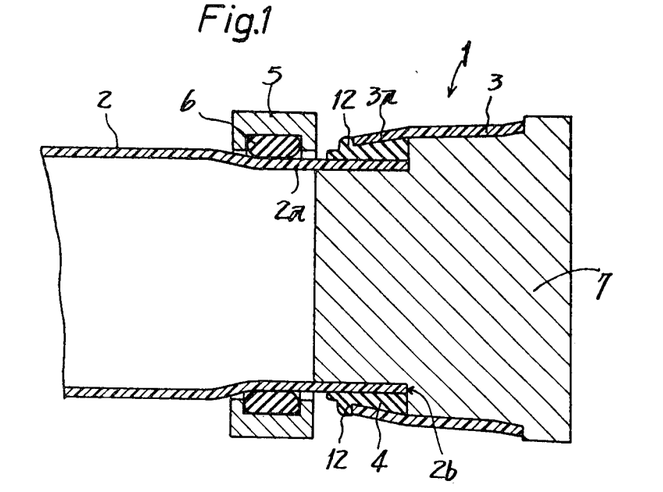
FIG. 1 is a longitudinal section of a first embodiment.
Figure 2:
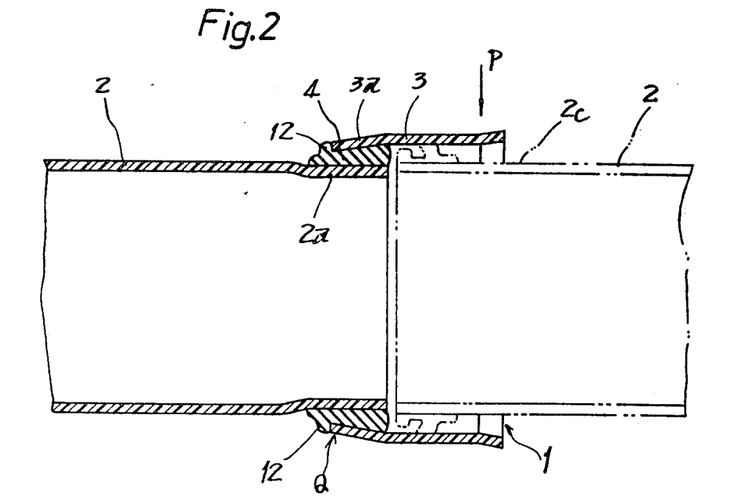
FIG. 2 is a section of a flexible pipe with a socket section produced by the method of the first embodiment.

In FIGS. 1 and 2, designated at 1 is a socket section, which is formed in such a manner that one end portion 3a of a socket member 3 is fitted over one end portion 2a of a straight pipe 2 and in this condition the pipe and socket member are integrated together. In the illustrated embodiment, an elastic member 4 is interposed between the portions 2a and 3a in the overlap region. In producing such flexible pipe with a socket section, with the method shown in FIG. 1 the outer surface of the one end portion 2a of the straight pipe is clamped by a clamping jig 5 so that it is elastically reduced in diameter. At the time of this diameter reduction clamping, it is desirable to interpose a buffer 6 such as a rubber ring between the jig 5 and the outer surface of the straight pipe one end portion 2a so as to assure uniform circumferential clamping. The amount of reduction in diameter, though varying according to the type of pipes, is suitably of the order of 1/300–1/3,000 of the pipe diameter. Next, an adhesive is applied to the outer surface of the diametrically reduced straight pipe one end portion 2a. If the straight pipe 2 is a filament winding pipe (FW pipe) formed by winding resin-impregnated glass fibers, since the outer pipe surface presents a difficultly-adherent surface condition it is desirable to polish the outer surface as by a grinder prior to the application of said adhesive. An elastic member 4 such as rubber packing is then fitted over the straight pipe one end portion 2a, whereby the elastic member 4 is adhesively fixed in position. If such elastic member 4 employed has an inner diameter about 10% smaller than the outer diameter of the straight pipe 2 so that it is fitted thereover in a stretched condition, then the tension in the elastic member 4 cooperates with the adhesive power of the adhesive to improve the joining force and water-tightness. After the elastic member 4 has been fitted over the straight pipe one end portion 2a in this manner, a socket member forming mandrel 7 is brought against a straight pipe end surface 2b and resin-impregnated glass fiber is wound around the outer surface of said elastic member 4 and the outer surface of said mandrel 7, thereby forming a socket member 3 of predetermined thickness. If the material of the socket member 3 is a thermosetting resin, the mandrel 7 is heated by suitable means or other suitable heating method is used to thermally set the resin. When the socket member 3 has set, the clamping jig 5 is loosened and removed while withdrawing the mandrel 7, whereupon the diametrically reduced straight pipe one end portion 2a tends to elastically resume its original condition, with the resulting diametrically expanding force causing the straight pipe one end portion 2 to be fitted under pressure in the one end portion 3a of the socket member 3 through the elastic member 4, so that the two members are strongly joined together as assisted by the adhesive or by the adhesion of the resin material of the socket member 3, thus, providing a pipe having a socket section 1 integral therewith as shown in FIG. 2.

Such flexible pipe with a socket receives the other end portion 2c of another such flexible pipe through a packing 8, as shown in phantom lines in FIG. 2. In this manner, flexible pipes are connected together for piping work. When such piping is embedded in the ground, the flexible pipes deform about 5% under soil pressure. According to the flexible pipe with a socket portion produced by the present invention, however, since the straight pipe 2 and the socket member 3 are bonded together by the adhesive with an internal stress acting to provide a force fit therebetween, they are joined together so strongly that there is no danger of separation taking place in the interface between the straight pipe 2 and the socket member 3. Further, by interposing an elastic member 4 of low modulus of elasticity between the straight pipe 2 and the socket member 3 in the overlap region as in the illustrated embodiment, it is possible for the elastic member 4 to have a shock absorbing and stress distributing action as it deforms, so that external forces concentratively acting on the joined portions of the straight pipe 2 and socket member 3 as when a non-uniform subsidence of ground takes place can be absorbed and that when a bending force acts on the front end of the socket section 1 as indicated by an arrow P as when the pipeline is bent at the pipe connection, it is possible to distribute the concentrated stress acting on the front end portion Q of one end portion 3a of the socket member 3, thereby obviating the danger of cracks starting in the region of the straight pipe 2 opposed to the portion Q. Thus, the flexible pipe of the present invention is useful particularly for underground piping work in soft ground.

Figure 3:
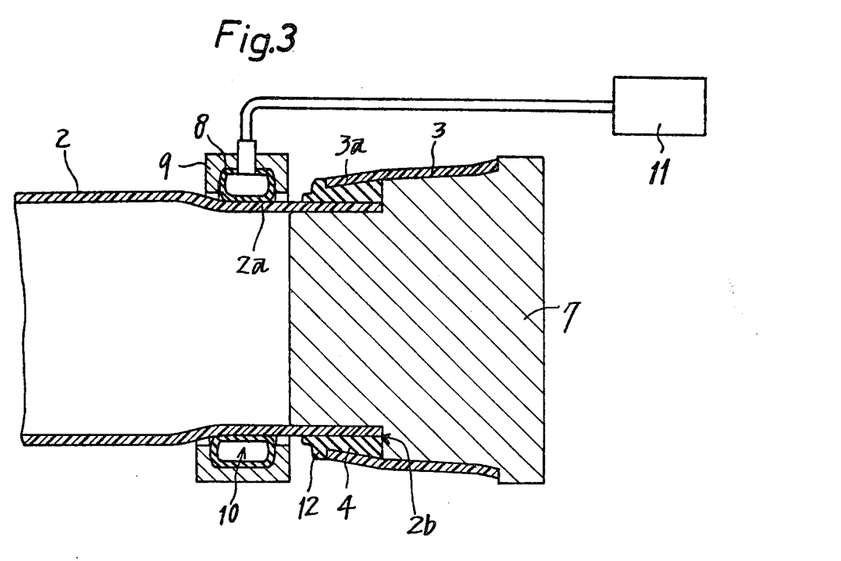
FIG. 3 is a longitudinal section of a modification of the first embodiment.
Figure 4A:
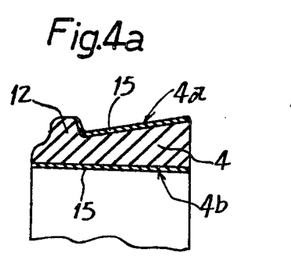
FIGS. 4a through 4f are sectional views showing various modifications of the elastic member.
Figure 4B:
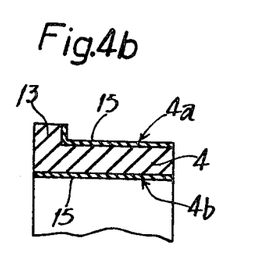
Figure 4C:
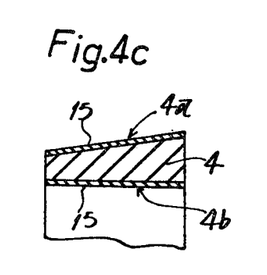
Figure 4D:
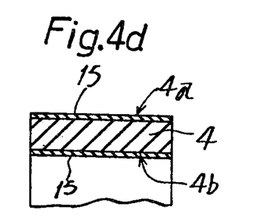
Figure 4E:
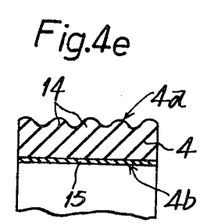
Figure 4F:
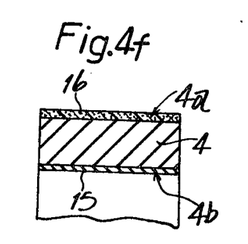

While the embodiment shown in FIG. 1 has used a clamping jig 5 and a buffer 6 for reduction in the diameter of one end portion 2a of a straight pipe 2, an alternative method of diametrical reduction is shown in FIG. 3, wherein a hollow annular body 8 having a deformable cross-section is fitted over one end portion 2a of a straight pipe and a pressure receiving jig 9 for preventing the diametrical expansion of the outer diameter of said body is fitted over the outer surface of said hollow annular body 8, whereupon pressurized fluid is forced into the hollow 10 of the hollow annular body 8 so as to reduce its inner diameter, thereby clamping the straight pipe one end portion 2a to reduce its diameter. It is desirable that the hollow annular body 8 be in the form of a rubber tube having a reinforcement incorporated therein so as to maintain the circumferential length of its cross-sectional shape unchanged even when fed with fluid under pressure or in the form of any other suitable elastic body whose cross-sectional shape will change only between flat shape and circular shape. Further it is desirable that the inner diameter of said hollow annular body 8 be smaller than the outer diameter of the straight pipe by a suitable amount so that when said body is fitted over the straight pipe one end portion 2a, its cross-sectional shape becomes flat. Further, as a pressure receiving jig 9 to be fitted over the hollow annular body, it is desirable to use one whose cross-section has flanges on opposite sides thereof so as to surround the hollow annular body on three sides, as shown in FIG. 3, so that the deformation of the hollow annular body 8 caused when fluid under pressure is forced into the hollow 10 may be directed exclusively inwardly. When the circumferential length of the cross-sectional shape of the hollow annular body 8 will not extend so much, of course, the flanges may be omitted. When pressurized fluid is forced into the hollow 10 with the hollow annular body 8 fitted over the straight pipe one end portion 2a and with the pressure receiving jig 9 fitted over said hollow annular body, the hollow annular body 8 deforms from a flat to a circular shape in its cross-section and along with this deformation the hollow annular body 8, whose outer diameter is held by the pressure receiving jig 9, is caused to have its inner diameter reduced, whereby the straight pipe one end portion 2a is elastically reduced in diameter.

As in the description of FIG. 1, after an elastic member 4 is fitted and fixed in position, a socket member 3 is formed and allowed to set, whereupon the pressurized fluid in the hollow 10 of the hollow annular body 8 is discharged for removal of the hollow annular body 9 and pressure receiving jig 9 and for withdrawal of the mandrel 7. In the case where the diametrical reduction of the straight pipe one end portion 2a is effected by the use of the hollow annular body 8 and pressure receiving jig 9 in the manner described above, the necessary device and the operation involved are very simple and yet the straight pipe one end portion 2a can be clamped with a uniform force throughout the periphery and reduced in diameter.

In the above embodiment, the socket member 3 has been described as being formed of a filament winding (FW). However, a preformed socket member 3 may be used. It is also clear that the invention is applicable not only to an FW pipe but also to other types of flexible pipes.

An elastic member such as shown at 4 has been interposed between the straight pipe one end portion 2a and the socket member 3, but without using such elastic member 4 the socket member 3 may, of course, be directly formed on or fitted over the straight pipe one end portion 2a. On the other hand, when the elastic member 4 is interposed, the shape and construction of the elastic member may be other than those shown in FIGS. 1 and 2 various forms shown in FIGS. 4a through 4f may be used.

FIG. 4 shows an elastic member used in the above illustrated embodiment. The outer surface 4a is a tapered surface with its diameter increasing toward the axial outer side of the straight pipe one end portion 2a, and a round projection 12 is formed on the outer surface of the end portion on the axial inner side, so that the socket member 3 is formed thereon or fitted thereover with its end abutting against said projection 12. In this case where the outer surface 4a is a tapered surface and has the projection 12, the engagement between the elastic member 4 and the socket member 3 prevents the axial displacement of the socket member 3 and hence the separation between said members can be prevented. Even the provision of the projection 12 alone is effective to prevent the displacement of the socket member 3 in one direction and thus prevent the separation. Further, the projection 12 provides a surface against which the socket member 3 abuts when the latter is formed or fitted, thus facilitating said formation and fitting operation. FIG. 4b shows an elastic member 4 having a cylindrical outer surface and a square projection 13 formed thereon. It is possible to use one having a tapered outer surface 4a with no projection formed thereon, as shown in FIG. 4c, or one having a rectangular cross-section, as shown in FIG. 4d. Further, as shown in FIG. 4e, the elastic member 4 may be formed with a plurality of undulations 14 on the outer surface thereof so that the elastic member 4 and the socket member 3 axially engage each other, the increased area of contact improving the adhesion. Further, in order to improve the adhesion, the outer surface and/or inner surface of the elastic member 4 may be treated with hydrochloric acid or, as shown in FIGS. 4a through 4f, the outer surface 4a and/or inner surface 4b may be desirably provided with junction layers 15 formed of rubber or other material which provides satisfactory adhesion between the straight pipe 2 or socket member 3 and the elastic member 4. Such junction layers 15 may be formed by adhesion or extrusion simultaneously with the extrusion formation of the elastic member 4. Further, as shown in FIG. 4f, the outer surface of the elastic member 4 may be provided with a resin layer 16 formed of the same material as that of the socket member or a resin or a resin-impregnated reinforced fiber which has an affinity for the material of the socket member. In this case, not only the outer surface 4a but also the inner surface 4b may be formed with said resin layers, as required. Further, when there is the danger of the elastic member 4 being attacked by the material of the socket member 3 when the latter is formed, it is necessary to use a resin for the resin layer 16 which is resistant to the socket member forming resin. For example, if the socket member 3 is formed of FRP material and unsaturated polyester resin, which is widely used as the resin therefor, is employed and rubber is used as the elastic member 4, since rubber has the property of swelling in styrene, the styrene in said resin would dissolve the outer surface of the elastic member 4 to cause it swell and become deteriorated during the formation of the socket member 3, involving the danger of displacing and deforming the socket member 3 subsequent to the joining operation and decreasing the joining strength. Accordingly, it is advisable to cover the outer surface of the elastic member 4 with a styrene-resistant material, such as epoxy resin, and allow it to set, thereby forming the resin layer 16. Of course, the material of the resin layer 16 is suitably selected depending upon the type of material of the elastic member 4 and the type of resin forming the socket member 3.

As for said adhesive, various rubber type adhesives or highly viscous thermoplastic resin type adhesives or mixtures thereof may be used, but the use of epoxy resin type and polyurethane type adhesives is advantageous since they are thermosetting resin type adhesives and do not need the use of solvents. As for the elastic member 4, any materials that are usually used as sealing materials may be used. For example, natural rubber, and synthetic rubbers including chloroprene rubber, acrylic rubber and nitryl rubber may be used, and those having synthetic resin incorporated therein or those reinforced by fabric, metal or the like may sometimes be used.

Figure 5A:
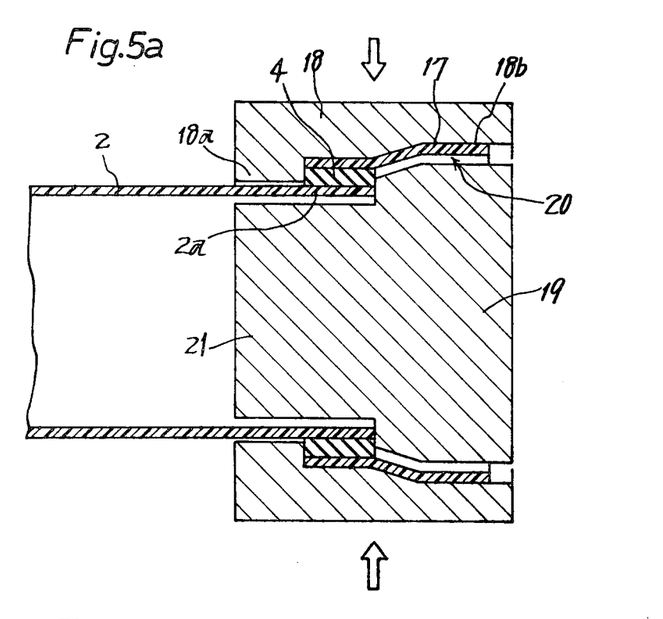
FIGS. 5a through 5c, 6a through 6c, 7a through 7c and 8a through 8c are sectional views showing second through fifth embodiments.
Figure 5B:
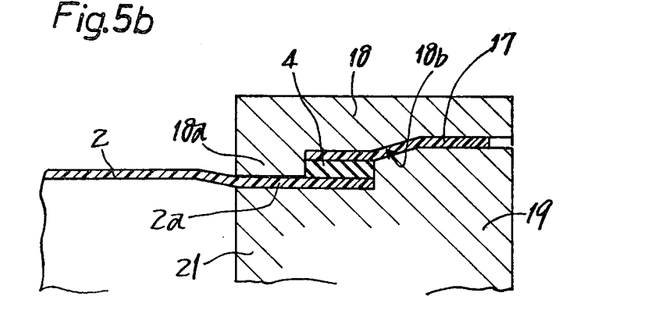
Figure 5C:
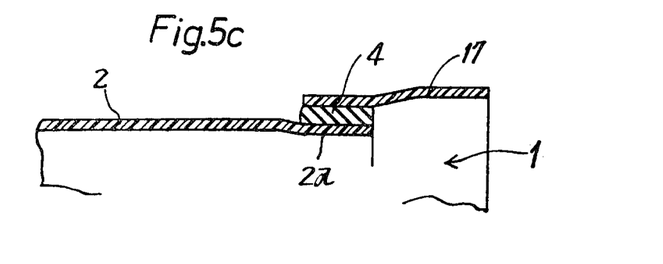

A second embodiment of the present invention will now be described with reference to FIGS. 5a through 5c. The straight pipe one end portion 2a is reduced in diameter by a press mold 18 enclosing and contacting a socket member 17 consisting of unset resin, and in this condition the socket member 17 is allowed to set, whereby the straight pipe 2 and the socket member 17 are integrated in mutually fitted relation. More particularly, a shaping inner mold 19 having an outer diameter conforming to the inner surface shape of a socket section 1 to be shaped is positioned outwardly of the straight pipe one end portion 2a, an elastic member 4 is adhesively secured to the outer surface of said straight pipe one end portion 2a, and a press mold 18 enclosing and contacting a socket member 16 consisting of unset resin is fitted over said elastic member 4. In this condition, there is a suitable clearance 20 defined between the inner surface of the socket member 17 and the outer surface of the inner mold 19. Subsequently, said press mold 18 is contracted as indicated by an arrow in FIG. 5a, whereby the straight pipe one end portion 2a is pressed for diametrical contraction by the press portion 18a while the socket member 17 is shaped to the desired form between the shaping portion 18b and said shaping inner mold 19. In the condition shown in FIG. 5b, the socket member 17 is allowed to set. After the socket member 17 has set, the press mold 18 is unfolded and removed and the inner mold 19 is withdrawn, thereby providing a flexible pipe having a socket section, as shown in FIG. 5c, in which an internal stress due to the restoring force of the straight pipe one end portion 2a is acting to provide a force fit between the straight pipe 2 and the socket member 17. In addition, as shown, the inner mold 19 may be formed with a projecting press portion 21 whose outer diameter is smaller than the inner diameter of the straight pipe 2 so that said press portion 21 can be loosely fitted in the straight pipe one end portion 2a. Reversely, the inner mold 19 may be omitted if the socket member 17 consisting of unset resin is enclosed in and contacted by the press mold 18 in half set condition allowing the socket member to retain the required shape during the pressing operation and is shaped to the desired form. In the illustration, the elastic member 4 has been bonded to the outer surface of the straight pipe one end portion, but such elastic member 4 may be omitted, as in the case of the first embodiment and it goes without saying that the shape and construction of the elastic member 4 may take the various forms shown in FIG. 4.

Figure 6A:
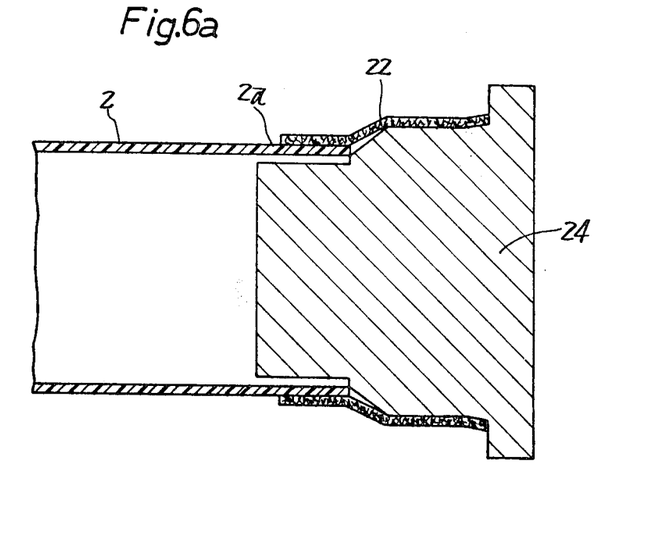
Figure 6B:
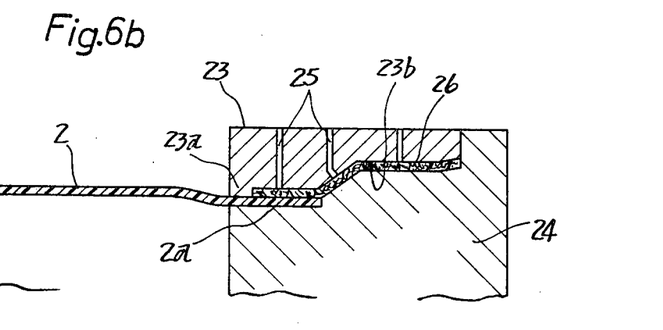
Figure 6C:
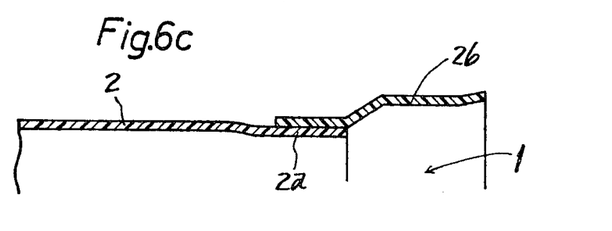

FIGS. 6a through 6c show a third embodiment. In this embodiment, the socket member 17 of unset resin in the second embodiment described above is replaced by a reinforcing material 22, such as glass fiber, wound at the socket member forming position and the straight pipe one end portion 2a is diametrically contracted by a press mold 23 having resin pouring ports. In this condition, resin is poured into said winding of reinforcing material to form a socket member 26. More particularly, as shown in FIG. 6a, a shaping inner mold 24 having an outer diameter conforming to the shape of the inner surface of a socket section 1 is positioned outwardly of the straight pipe one end portion 2a, the reinforcing material 22 is wound around the outer surface of the straight pipe one end portion 2a and around the outer surface of the inner mold 24, and the press mold 23, which has a press portion 23a whose inner diameter will become smaller than the outer diameter of the straight pipe 2 when contracted and which has resin pouring ports 25 opening into the shaping portion 23b, is mounted so as to cover said winding of reinforcing material, said press mold 23 being then contracted. Resin is then poured through the pouring ports 25 to form the socket member 26. After the resin has set, the press mold 23 is unfolded and removed and the inner mold 24 is withdrawn, thereby providing a flexible pipe having a socket section in which the socket member 26 and the straight pipe 2 are integrated, as shown in FIG. 6c. In addition, in this embodiment also, an elastic member 4 may be interposed between the socket member 26 and the straight pipe 2.

Figure 7A:
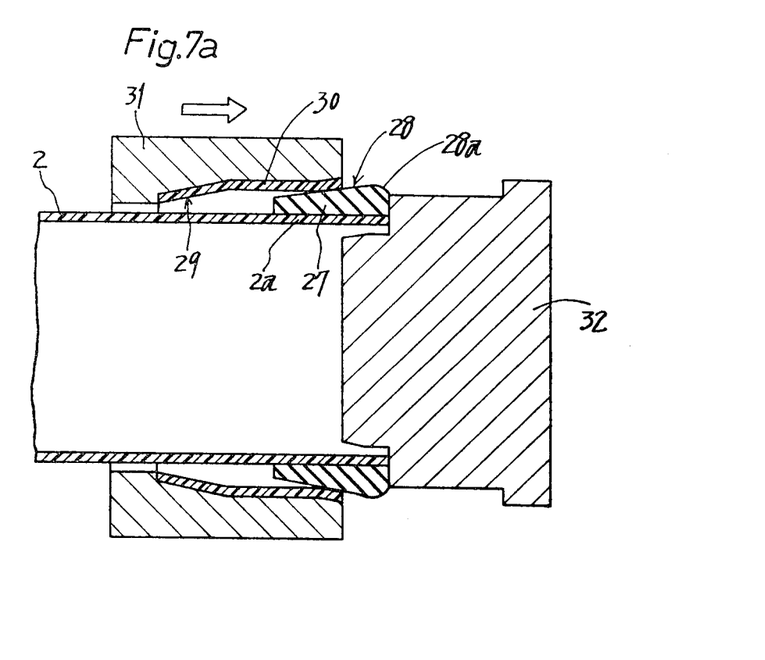
Figure 7B:
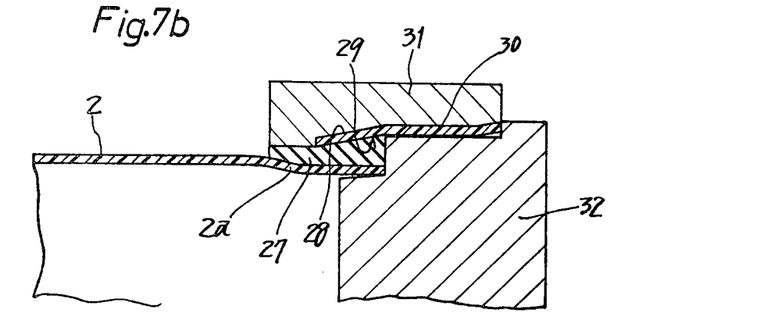
Figure 7C:
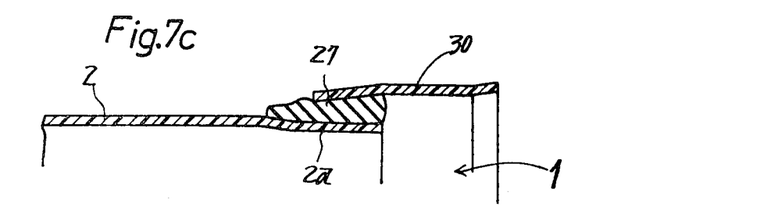

FIGS. 7a through 7c show a fourth embodiment. As shown, a wedge member 27 having an outer surface 28 inclined with respect to the axis of the straight pipe 2 is adhesively secured to the outer surface of the straight pipe one end portion 2a in such a manner that the larger diameter side 28a of said inclined outer surface 28 is positioned outwardly of the straight pipe one end portion 2a. A socket member 30 having an inclined inner surface 29 on one side whose maximum diameter is smaller than the maximum diameter of the inclined outer surface 28 is fitted over the straight pipe 2, and the socket member 30 is moved outwardly of the straight pipe one end portion 2a so as to elastically diametrically contract the straight pipe one end portion 2a by the wedge action exerted by cooperation between the inclined inner surface 29 and the inclined outer surface 28. In this condition, the wedge member 27 and the socket member 30 are adhesively secured together. More particularly, said wedge member 27 is formed of rubber or the like, said socket member 30 is enclosed, contacted and supported by a support outer mold 31, a support inner mold 32 abuts against the end face of the straight pipe one end portion 2a, and an adhesive is applied to the inclined outer surface 28 of the wedge member 27 and to the inclined inner surface 29 of the socket member 30, whereupon the support outer mold 31 is moved as indicated by an arrow in FIG. 7a to establish the condition shown in 7b. After the resin has set, the support outer mold 31 is moved in the direction opposite to the previous one and removed and the support inner mold 32 is withdrawn, thereby providing a flexible pipe having a socket section 1, as shown in FIG. 7c.

Figure 8A:
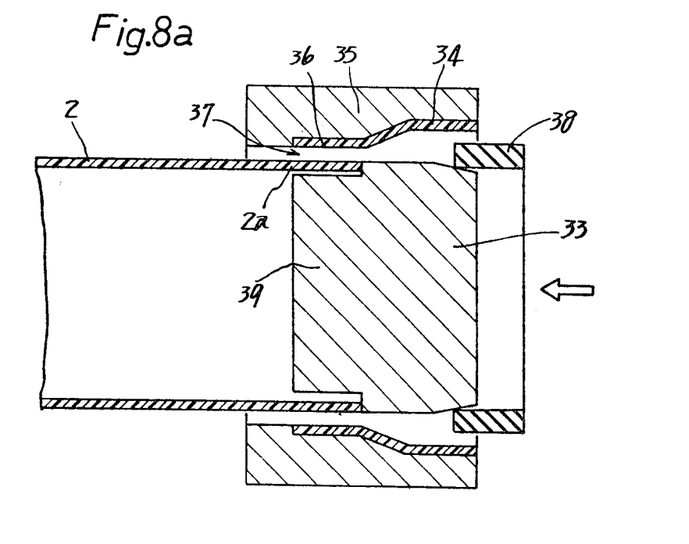
Figure 8B:
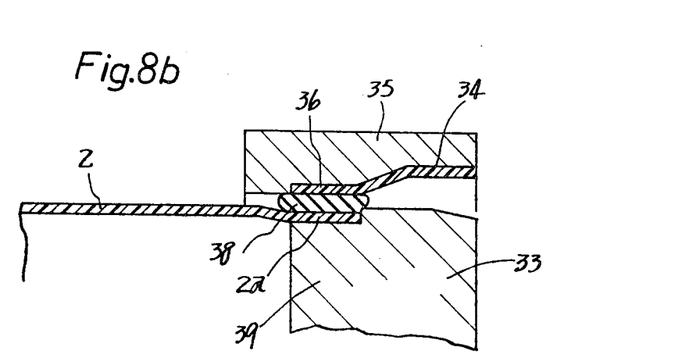
Figure 8C:
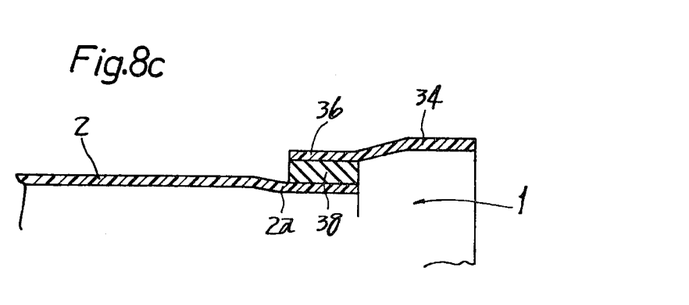

FIGS. 8a through 8c show a fifth embodiment. In this embodiment, an inner mold 33 is inserted into the straight pipe one end portion 2a and a support outer mold 35 enclosing and contacting a socket member 34 is positioned around the outer surface of the straight pipe one end portion 2a. In this condition, inserted into a clearance 37 between the outer surface of the straight pipe one end portion 2a and the one end portion 36 of the socket member 34 overlapping the same is an elastic member 38 thicker than said clearance, as indicated by an arrow in FIG. 8a, after an adhesive is applied to the inner and outer surfaces of said elastic member. In the inserted condition, as shown in FIG. 8b, the elastic member 38 has been elastically compressed. After said adhesive has set, the support outer and inner molds 35 and 33 are removed, thereby providing a flexible pipe having a socket section 1, as shown in FIG. 8c, in which a force corresponding to the compressive reaction of the elastic member 38 is acting to provide a force fit between the straight pipe one end portion 2a and the one end portion 36 of the socket member 36. In addition, said inner mold 33 has been installed to serve as a guide for the insertion of the elastic member 38. The support outer mold 35 serves to hold the socket member 34. When such support outer mold 35 is used, the one end portion of the socket member 36 will not diametrically expand even if subjected to the compressive reaction of the elastic member 38, said compressive reaction being counteracted solely by the straight pipe one end portion 2a. This situation would sometimes cause inconvenience to the operation as it would bring about excessive diametrical contraction of the straight pipe one end portion 2a. For this reason, it is desirable that the inner mold 33 be provided with a press portion 29 whose outer diameter is suitably smaller than the inner diameter of the straight pipe one end portion 2a, said press portion 39 being loosely fitted in the straight pipe one end portion 2a so that in the condition shown in FIG. 8b, the straight pipe one end portion 2a may not be diametrically contracted beyond a certain amount.

I claim:
1. A method of producing a flexible pipe with a socket in which to a prefabricated flexible pipe there is fixed a socket element overlapping the end portion of said flexible pipe, characterized by:
  (a) elastically contracting the diameter of the one end portion of the pipe,
  (b) fitting an elastic member on the outer surface of the one end portion of the pipe with an adhesive between the one end portion and the elastic member,
  (c) bringing a socket element shaping mandrel against the end surface of the pipe,
  (d) winding resin-impregnated reinforcing fiber around the outer surface of said elastic member and the mandrel to form the socket element, and
  (e) relieving the elastic diametrical contraction after the resin is set.

2. A method as set forth in claim 1, characterized in that an adhesive is applied to the outer surface of the elastic member around which the resin-impregnated reinforcing fiber is wound.

3. A method as set forth in claim 1, characterized in that the outer surface of said elastic member is covered with a resin in advance which is chemically resistant to the socket element forming material.

4. A method as set forth in claim 1, characterized in that a hollow annular body whose cross-sectional shape is variable is fitted over said one end portion of the pipe and a pressure receiving jig which prevents the diametrical expansion of the outer diameter of said hollow annular body is fitted over the outer surface of the latter, whereupon pressurized fluid is fed into the hollow of said hollow annular body to diametrically contract said one end portion.

5. A method for the production of flexible pipes with a socket in which to a prefabricated flexible pipe there is fixed a socket element overlapping the end portion of said flexible pipe, characterized by:
 (a) providing a press mold for the shaping of the socket element,
 (b) fitting the press mold over the outer surface of one end portion of the pipe in a position such that the socket element carried by the press mold overlaps such one end portion of the pipe,
 (c) elastically reducing the diameter of such one end portion of the pipe by the press mold and in this condition completely forming the socket element, and
 (d) fixing the socket element in the entire overlap to the reduced end portion of the pipe firmly under the elastic stress thereof directed radially outwardly upon releasing the reduction.

6. A method as set forth in claim 5, characterized in that disposed inside said press mold is a shaping inner mold having an outer shape conforming to the shape of the inner surface of the socket section to be formed.

7. A method as set forth in claim 6, characterized in that the socket element consisting of unset resin is enclosed and contacted by said press mold.

8. A method as set forth in claim 6, characterized in that after a reinforcing material is wound around the outer surface of said one end portion of the pipe and around the outer surface of the shaping inner mold, the press mold is fitted over and a resin is poured into the winding of reinforcing material in said press mold.

9. A method as set forth in claim 5, characterized in that the socket element consisting of unset resin is enclosed and contacted by said press mold.

10. A method for the production of flexible pipes with a socket in which to a prefabricated flexible pipe there is fixed a socket element overlapping the end portion of said flexible pipe, characterized by:
 (a) providing a wedge member having an outer surface inclined with respect to the pipe axis,
 (b) adhesively securing said wedge member to the outer surface of the end portion of the pipe with the larger diametered side of said inclined outer surface positioned outwardly of said one end portion,
 (c) providing a socket element having an inclined inner surface whose maximum diameter is smaller than the maximum diameter of the inclined outer surface of said wedge member,
 (d) fitting said socket element in overlapping relation with respect to said end portion of the pipe and moving said socket element relatively toward the outer side of said end portion of the pipe so that the wedge member and socket element are adhesively secured together,
 (e) elastically reducing the diameter of said end portion of the pipe, and
 (f) fixing the socket element in the entire overlap to the reduced end portion of the pipe firmly under the elastic stress thereof directly radially outwardly through said wedge member upon releasing the reduction.

11. A method as set forth in claim 10, characterized in that said wedge member comprises an elastic member.

12. A method for the production of flexible pipes with a socket in which to a prefabricated flexible pipe there is fixed a socket element overlapping the end portion of said flexible pipe, characterized by:
 (a) overlapping the socket element with respect to the end portion of the flexible pipe to provide a clearance therebetween,
 (b) providing an elastic member thicker than the clearance between the outer surface of the pipe and the inner surface of the socket element,
 (c) applying an adhesive to the inner and outer surfaces of said elastic member,
 (d) inserting said elastic member with the adhesive applied thereto into said clearance,
 (e) inserting an inner mold into said end portion of the pipe,
 (f) disposing an outer mold about the outer surface of said end portion of the pipe enclosing and contacting the socket element,
 (g) elastically reducing the diameter of the end portion of the pipe by means of said outer mold, and
 (h) fixing the socket element in the entire overlap to the reduced end portion of the pipe firmly under the elastic stress thereof directed radially outwardly through said elastic member upon releasing the reduction.

* * * * *